United States Patent
Ness

[11] 3,956,825
[45] May 18, 1976

[54] POTATO AND VEGETABLE PEELERS
[75] Inventor: Ralph Ness, Minot, N. Dak.
[73] Assignee: Raymond Lee Organization, New York, N.Y.
[22] Filed: Feb. 19, 1975
[21] Appl. No.: 550,928

[52] U.S. Cl. .................................. 30/279 R; 30/283
[51] Int. Cl.² ............................................ B26B 3/00
[58] Field of Search ................. 30/278, 283, 279 R, 30/280

[56] References Cited
UNITED STATES PATENTS

| | | | |
|---|---|---|---|
| 432,770 | 7/1890 | Schlief | 30/279 R |
| 577,384 | 2/1897 | Loeffler | 30/279 R |
| 1,296,805 | 3/1919 | Holownia | 30/283 |
| 1,608,813 | 11/1926 | Richter | 30/278 |
| 2,756,501 | 7/1956 | Linemfelser | 30/283 |

FOREIGN PATENTS OR APPLICATIONS

| | | | |
|---|---|---|---|
| 18,320 | 6/1882 | Germany | 30/283 |

Primary Examiner—Al Lawrence Smith
Assistant Examiner—Roscoe V. Parker
Attorney, Agent, or Firm—Stephen Wyden

[57] ABSTRACT

A vegetable peeler in one version that is pushed against the vegetable and removes the skin by an impressed blade; in another version, a relatively long blade is rotatable in a frame to remove a variable thickness of the vegetable at each stroke.

1 Claim, 6 Drawing Figures

U.S. Patent    May 18, 1976    3,956,825
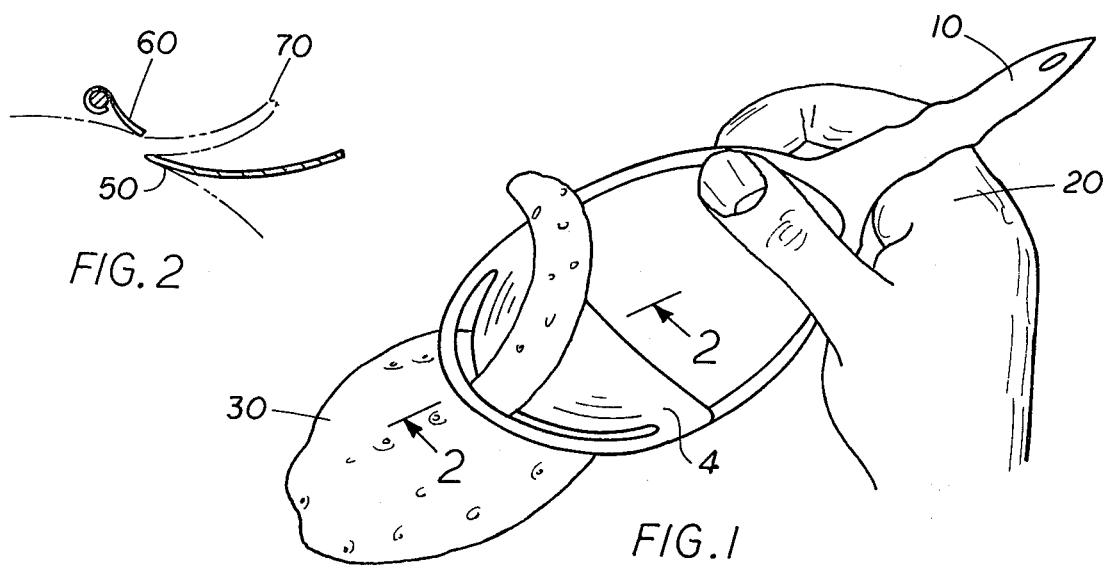
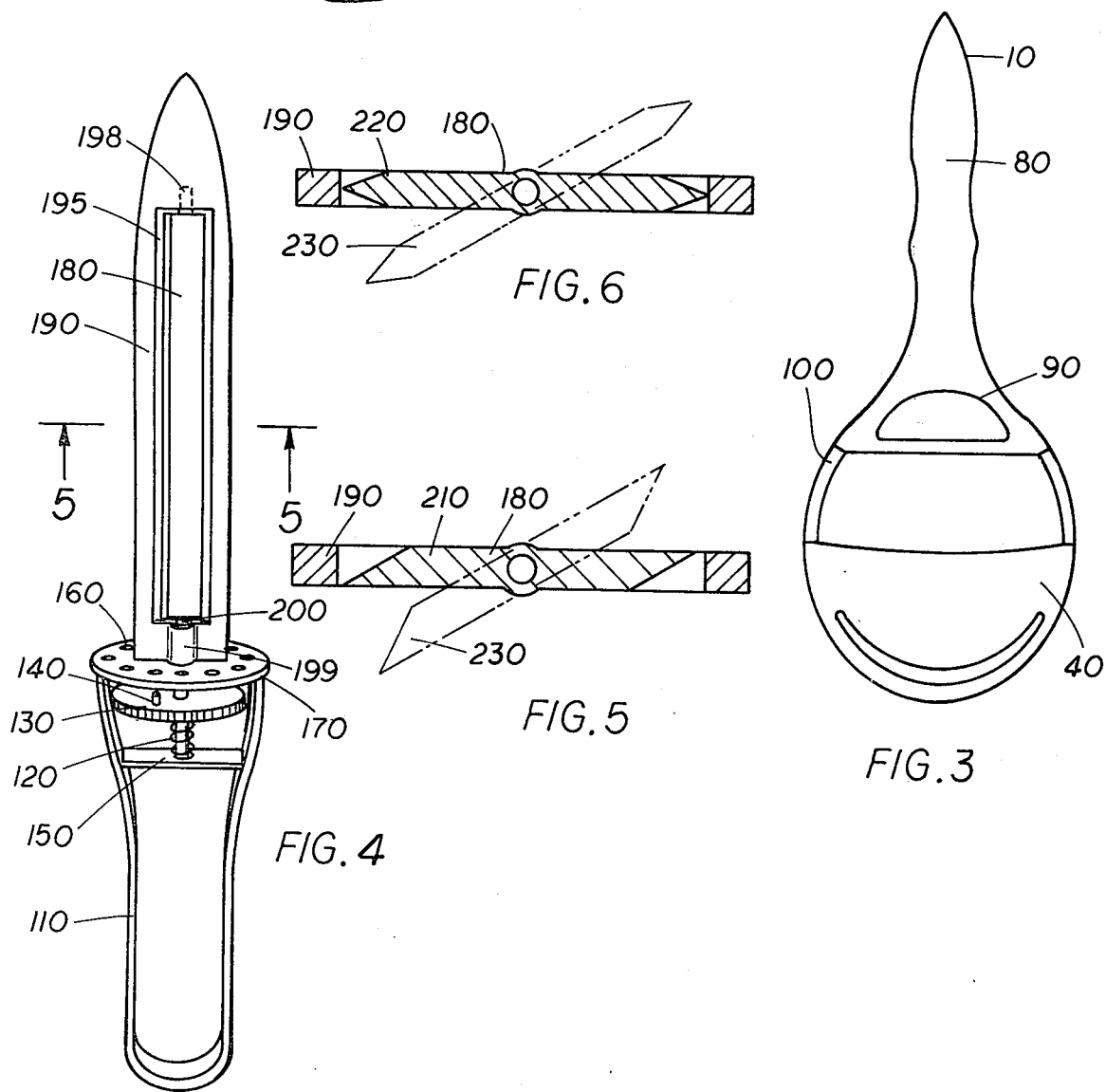

POTATO AND VEGETABLE PEELERS

I have invented a new and novel means to peel vegetables and potatoes. In both versions of my device, the pushing of the peeler against the vegetable removes the skin or a slice of the vegetable.

My invention can be best understood in view of the accompanying diagrams.

FIGS. 1, 2, and 3, show a spoon shaped device with a cutting edge.

FIG. 1, is a perspective view of the device in use.

FIG. 2 is view along the plane 2—2 of FIG. 1 showing a cross-section of the cutting edge of the device.

FIG. 3 is a front view of the device.

FIGS. 4 and 5 are of another version of my peeler. FIG. 4, shows the face view of the peeler. FIG. 5 is a view along the plane 5—5 of FIG. 4 showing the construction of the blades.

FIG. 6 shows a cross-section of another blade construction has been added.

In FIG. 1, when the spoon shaped peeler 10 is gripped in the hand 20 it can be pushed to peel a potato 30 or other vegetable with the blade 40.

In FIG. 2, the curved blade 40 of FIG. 1 is seen to have a slot with displaced lateral edges that cooperate to allow one edge 50 to peel the vegetable while the other edge 60 guides the peeler and determines the thickness of the peelings 70.

In FIG. 3, the peeler 10 consists of a handle 80 with a built in bottle opener 90, an oval loop 100 attached to the handle 80 and the blade 40 mounted on the front of the oval loop 100.

In FIG. 4, the other version of the peeler 110, in the handle 110 is mounted a spring loaded 120 indexing disk 130 with lock pin 140 acting against a cross bar 150 and cooperating with a multitude of index holes 160 in a stationary disk 170 to hold a cutting blade 180 in a predetermined position relative to a frame 190 mounted to the handle that the blade 180 is mounted to by a shaft 200. The blade is mounted in a rectangular opening in the central portion of the frame 195. The shaft is mounted in a slot 198 in the frame 190 and in a shaftway 199 in the frame 190 and the stationary disk 170.

In FIG. 5, the cutting edge of the blade 180 is seen to be either single edged 210 or double edged 220. When the blade 180 is rotated as seen in phantom 230, the angle between the blade 230 and the frame 190 determines the thickness of material removed with each stroke.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. A Vegetable And Potato Peeler with variable blade angle, comprising;
   a handle,
   a cross bar mounted in the handle,
   a stationary disk forming the front end of the handle,
   a frame mounted to the stationary disk,
   a plurality of indexing holes formed in the stationary disk,
   a rectangular opening formed in the central portion of the frame,
   a shaftway formed in the center of the stationary disk and continuing in the base of the frame,
   a slot formed in the frame at the upper edge of the rectangular opening,
   a shaft mounted in the shaftway and terminating in the slot in the frame,
   a blade mounted on the shaft and in the rectangular opening of the frame, and
   an indexing disk mounted on the shaft and spring loaded to cooperate with the indexing holes, whereby the angle of the blade relative to the frame may be predeterminedly fixed.

* * * * *